United States Patent
Urbahn et al.

(10) Patent No.: US 7,255,013 B2
(45) Date of Patent: Aug. 14, 2007

(54) METHOD AND APPARATUS FOR MEASURING CRYOGENIC FLOW

(75) Inventors: John Urbahn, Saratoga Springs, NY (US); Robert Adolph Ackermann, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/265,234

(22) Filed: Nov. 2, 2005

(65) Prior Publication Data
US 2007/0095150 A1    May 3, 2007

(51) Int. Cl.
*G01F 1/46* (2006.01)
(52) U.S. Cl. .................................................. 73/861.65
(58) Field of Classification Search .................. 73/861, 73/861.61, 861.52, 861.65; 166/303, 250
See application file for complete search history.

(56) References Cited

U.S. PATENT DOCUMENTS

| | | | |
|---|---|---|---|
| 4,050,515 A * | 9/1977 | Hamrick et al. ............ 166/303 |
| 4,835,456 A | 5/1989 | Liu et al. | |
| 4,924,679 A | 5/1990 | Brigham et al. | |
| 4,972,180 A * | 11/1990 | Akai et al. ................... 340/611 |
| 5,027,076 A | 6/1991 | Horsley et al. | |
| 5,679,905 A | 10/1997 | Wardle | |
| 5,728,417 A | 3/1998 | Horn et al. | |
| 6,435,041 B1 | 8/2002 | Bhowmick et al. | |
| 6,595,048 B1 | 7/2003 | Drube et al. | |
| 6,732,594 B2 | 5/2004 | Drube et al. | |
| 6,955,095 B2 | 10/2005 | Drube et al. | |
| 7,054,764 B2 | 5/2006 | Williams et al. | |
| 2004/0244366 A1* | 12/2004 | Hiranuma et al. ............ 60/286 |

OTHER PUBLICATIONS

Block, H. and Hoefner, J., "Operation and Maintenance of Reciprocating Compressors," Gulf Publishing Co., 1996, pp. 133-135.
Davis, G., "Using PV Curves to Diagnose a Recip Valve Problem," Orbit, vol. 24, No. 1, 2004, pp. 48-54.

* cited by examiner

*Primary Examiner*—Jewel Thompson
(74) *Attorney, Agent, or Firm*—Ann M. Agosti; Patrick K. Patnode

(57) ABSTRACT

A method for calculating a mass flow rate of a cryogenic fluid within a flow tube includes positioning a sensor within a stream of cryogenic fluid flowing through the flow tube. The sensor is operatively coupled to a strain gauge. A difference between a dynamic pressure in the fluid stream and a static pressure in the fluid stream is measured and the mass flow rate of the cryogenic fluid within the flow tube is calculated.

16 Claims, 1 Drawing Sheet

METHOD AND APPARATUS FOR MEASURING CRYOGENIC FLOW

STATEMENT REGARDING FEDERALLY SPONSORED RESEARCH & DEVELOPMENT

The U.S. Government may have certain rights in this invention pursuant to contract number DOE DE-FC36-02GO11100.

BACKGROUND OF THE INVENTION

This invention relates generally to cryogenic fluids and, more specifically, to measuring a mass flow rate of a cryogenic fluid.

A cryogenic fluid is a liquefied gas, such as oxygen, nitrogen, hydrogen, methane, helium and/or acetylene, which has a temperature below about −150° F. Measuring a mass flow rate of a cryogenic fluid in a cryogenic fluid stream is difficult due to certain system requirements and/or limitations. For example, when measuring the mass flow rate of the cryogenic fluid, it is necessary to prevent or limit thermal leakage from the relatively warmer environment or surroundings, typically at "room temperature," to the relatively colder cryogenic fluid stream. Further, it is desirable to limit an exposure of the measuring device to the flow of the cryogenic fluid stream to facilitate preventing or limiting interference with and/or disruption of the flow due to the dimensional configuration of the measuring device.

BRIEF DESCRIPTION OF THE INVENTION

In one aspect, a method for calculating a mass flow rate of a cryogenic fluid within a flow tube is provided. The method includes positioning a sensor within a stream of cryogenic fluid flowing through the flow tube. The sensor is operatively coupled to a strain gauge. A difference between a dynamic pressure of the fluid stream and a static pressure of the fluid stream is measured and the mass flow rate of the cryogenic fluid within the cold flow tube is calculated using the measured pressure difference.

In another aspect, an apparatus for measuring a mass flow rate of a cryogenic fluid within a flow tube is provided. The apparatus is configured to measure a dynamic pressure of the cryogenic fluid stream and a static pressure of the cryogenic fluid stream.

In another aspect, the present invention provides an apparatus for measuring a mass flow rate of a cryogenic fluid flowing within a flow tube. The apparatus includes a sensor at least partially positioned within the flow tube. The sensor interferes with a cryogenic fluid stream. A first passage is defined within the sensor. The first passage has a first opening at an upstream end of the sensor that has a cross-sectional area substantially normal to a direction of flow of the cryogenic fluid stream. A second passage is defined within the sensor. The second passage has at least one second opening formed in a sidewall of the sensor. The at least one second opening is substantially parallel to the direction of flow. A housing is positioned with respect to the flow tube and defines a chamber. The chamber is in independent flow communication with each of the first passage and the second passage. A diaphragm is positioned within the chamber at a first end portion of the housing. A strain gauge is positioned within the chamber. The strain gauge measures a deflection of the diaphragm corresponding to a difference between a dynamic pressure of the cryogenic fluid stream and a static pressure of the cryogenic fluid stream.

DETAILED DESCRIPTION OF THE INVENTION

Figure 1:
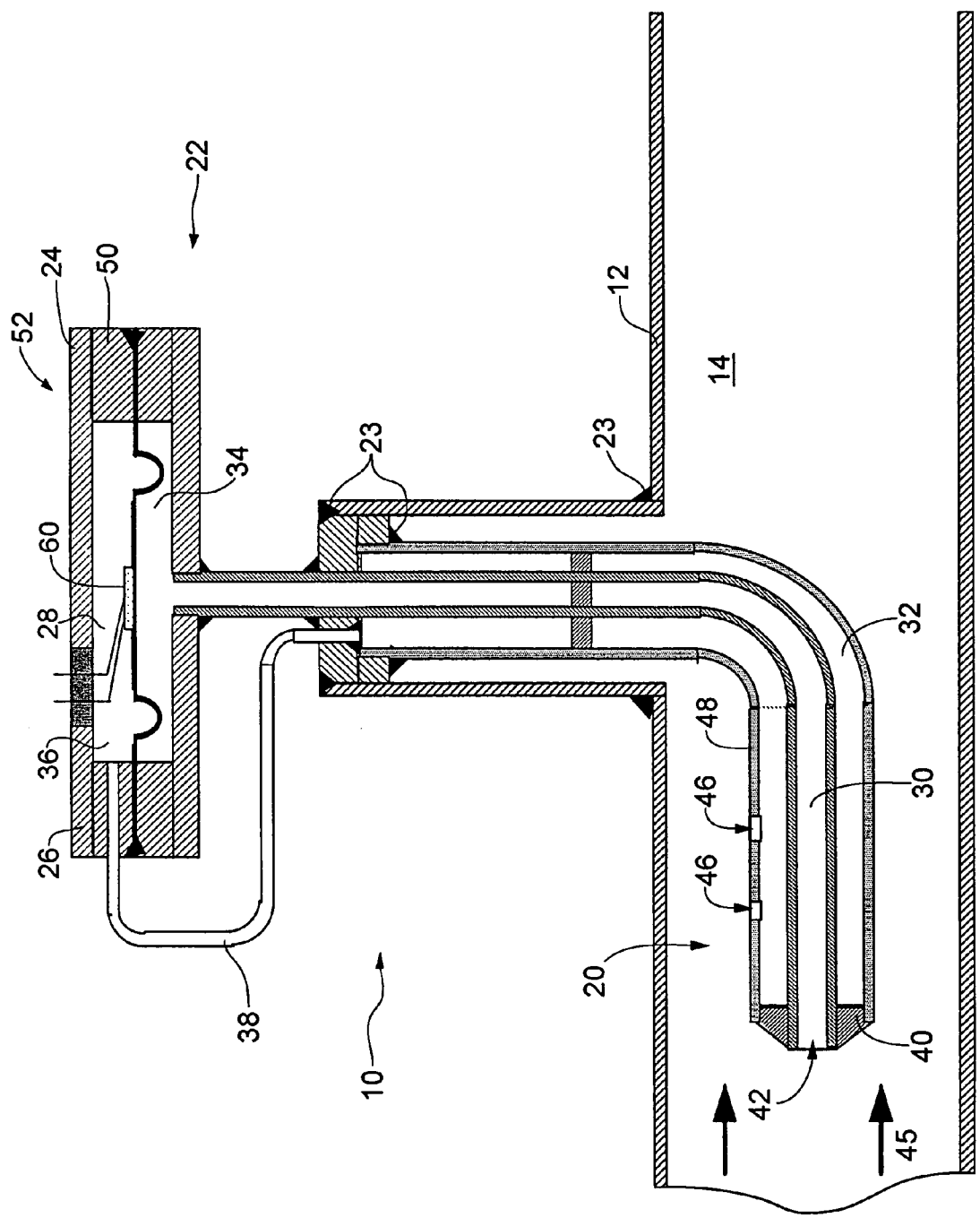
FIG. 1 is partial sectional view of a cryogenic fluid flow meter, according to one embodiment of this invention.

The present invention is directed to a method and apparatus for measuring a mass flow rate of a cryogenic fluid. The method and apparatus of the present invention measures the pressure difference between a static or ambient pressure and a dynamic or total pressure in a cryogenic fluid stream to calculate the mass flow rate of the cryogenic fluid. The pressure difference ($\Delta p$) between the static pressure ($p_s$) and the total pressure measured at a front or lead end of the apparatus ($p_d$) is equal to the change in kinetic energy of the cryogenic fluid stream, characterized by the following formula:

$$\Delta p = (p_d - p_s) = \frac{\gamma \vec{v}^2}{2g_c} \quad \text{(Eq. 1)}$$

wherein $\gamma$ is equal to a specific weight of the cryogenic fluid; $\vec{v}$ is the free stream velocity; and $g_c$ is the gravitational acceleration. Thus, the mass flow rate of the cryogenic fluid is calculated using the following equation:

$$m = A_f \sqrt{2g_c \Delta p \gamma} \quad \text{(Eq. 2)}$$

wherein $A_f$ is the free stream cross-sectional area.

In one embodiment, the pressure difference between the total pressure and the static pressure is measured by a deflection of a diaphragm, as discussed above. The deflection is given in terms of the strain ($\epsilon$) measured in the diaphragm with a strain gauge using the following equation:

$$\Delta p = A\epsilon \quad \text{(Eq. 3)}$$

where the constant $$A = E\left[\frac{8}{3}\frac{r^2}{r^2(1+\upsilon)}\right] \quad \text{(Eq. 4)}$$

wherein E is the elastic modulus, $\upsilon$ is Poisson's ratio and r is the radius of the diaphragm.

In one embodiment, the present invention provides an apparatus 10 or flow meter for measuring and/or calculating a mass flow rate of a cryogenic fluid flowing within a cold flow tube 12. As shown in FIG. 1, cold flow tube 12 defines a channel 14 through which a cryogenic fluid stream flows. Channel 14 has any suitable cross-sectional area sufficiently sized to allow flow of the cryogenic fluid stream therethrough, as desired. Apparatus 10 is suitable for measuring a dynamic pressure and a static pressure of the cryogenic fluid stream to calculate the mass flow rate of any cryogenic fluid including, without limitation, a liquefied gas, such as oxygen, nitrogen, hydrogen, methane, helium or acetylene, typically having a temperature below about −150° F. It is apparent to those skilled in the art and guided by the teachings herein provided that apparatus 10 may be used to measure the dynamic pressure and the static pressure of any suitable fluid at any suitable temperature including temperatures greater than and less than −150° F.

Apparatus 10 includes an input or lead portion 20 and a generally opposing output portion 22. Components of apparatus 10 are coupled or joined using a suitable joint, such as hermetic weld joints 23 shown in FIG. 1. In one embodiment, a measuring device 24 is positioned at outlet portion 22. Measuring device 24 includes a housing 26 positioned with respect to cold flow tube 12. As shown in FIG. 1, housing 26 defines a chamber 28 in independent flow communication with each of a first or inner passage 30 and a second or outer passage 32. Measuring device 24 is positioned within a vacuum space surrounding cold flow tube 12 such that measuring device 24 is outside of cold flow tube 12 and does not directly contact the cryogenic fluid stream flowing through channel 14. In one embodiment, housing 26 is insulated within a cold region or a vacuum-insulated space to minimize heat leakage from the surrounding environment into the relatively colder cryogenic fluid.

Inner passage 30 is defined within lead portion 20 and in flow communication with measuring device 24 positioned at output portion 22. In one embodiment, inner passage 30 is in flow communication with a first or high pressure section 34 defined within chamber 28 of measuring device 24. Outer passage 32 is positioned about inner passage 30 and in independent flow communication with measuring device 24. In this embodiment, outer passage 32 is in flow communication with a second or low pressure section 36 defined within chamber 28. In a particular embodiment, inner passage 30 and/or outer passage 32 are made of capillary tubes, with outer passage 32 generally positioned coaxially about inner passage 30, as shown in FIG. 1. A tube 38 provides flow communication between outer passage 32 and low pressure section 36 of measuring device 24. In alternative embodiments, any suitable material known to those skilled in the art and guided by the teachings herein provided may be used to make inner passage 30 and/or outer passage 32.

As shown in FIG. 1, apparatus 10 includes a sensor 40 coupled to lead portion 20. In one embodiment, sensor 40 is at least partially positioned within channel 14 to interfere with the cryogenic fluid stream flowing through channel 14. Sensor 40 includes at least one first opening 42 that provides flow communication between channel 14 and inner passage 30. In one embodiment, lead portion 20 is configured to position first opening 42 within channel 14 such that a cross-sectional area of first opening 42 is substantially normal to a direction of flow of the cryogenic fluid stream, as shown by arrow 45 in FIG. 1. As used herein, references to "substantially normal" are to be understood to refer to a position of first opening 42 within +/−5 degrees with respect to normal. In an alternative embodiment, first opening 42 may be positioned greater than within +/−5 degrees with respect to normal.

A portion of the cryogenic fluid stream is directed through inner passage 30 to measure a total or dynamic pressure in the flow stream at or near lead portion 20 of apparatus 10. In one embodiment, a cross-sectional area of lead portion 20 and/or the cross-sectional area of first opening 42 normal to the direction of flow 45 is minimized to prevent undesirable exposure to and/or disruption of the cryogenic fluid stream flowing through channel 14.

At least one second opening 46 is formed or defined within a sidewall 48 of apparatus 10 at lead portion 20. In one embodiment, a plurality of second openings, such as two second openings 46, are formed through sidewall 48 to provide flow communication between channel 14 and outer passage 32. In one embodiment, as shown in FIG. 1, lead portion 20 is configured to position each second opening 46 substantially parallel to the direction of flow 45. As used herein, references to "substantially parallel" are to be understood to refer to a position of each second opening 46 within +/−5 degrees with respect to parallel. In an alternative embodiment, at least one second opening 46 may be positioned greater than within +/−5 degrees with respect to parallel. A portion of the cryogenic fluid stream is directed through outer passage 32 to measure an ambient or static pressure in the cryogenic fluid stream at or near lead portion 20.

A diaphragm 50 is positioned with respect to chamber 28. In one embodiment, diaphragm 50 is made of a suitable metallic material and is positioned at an end 52 of housing 26, as shown in FIG. 1. Diaphragm 50 is in direct, independent flow communication with each of high pressure section 34 and low pressure section 36. In this embodiment, a pressure difference between the dynamic pressure of the cryogenic fluid stream measured through first opening 42 and the static pressure of the cryogenic fluid stream measured through second openings 46 is measured by a deflection of diaphragm 50 resulting from the pressure difference.

As shown in FIG. 1, a strain gauge 60 is positioned within chamber 28. In one embodiment, strain gauge 60 is positioned between high pressure section 34 and low pressure section 36 of chamber 28. Strain gauge 60 measures a deflection of diaphragm 50 corresponding to the pressure difference between the dynamic pressure of the cryogenic fluid stream and the static pressure of the cryogenic fluid stream. With the measured pressure difference, the mass flow rate of the cryogenic fluid stream can be calculated from Eq. 2, set forth above.

In one embodiment, apparatus 10 measures the dynamic pressure of the cryogenic fluid stream and the static pressure of the cryogenic fluid stream. A mass flow rate of a cryogenic fluid within cold flow tube 12 is calculated from the measured dynamic pressure of the cryogenic fluid stream and the measured static pressure of the cryogenic fluid stream. Apparatus 10 is configured to measure a dynamic pressure of the cryogenic fluid stream. Sensor 40 is positioned within cryogenic fluid stream. Sensor 40 forms inner passage 30 having first opening 42 at an upstream or lead end of sensor 40 within the cryogenic fluid stream such that a cross-sectional area of first opening 42 is substantially normal to a direction of flow of the cryogenic fluid stream. A portion of the cryogenic fluid stream is directed through inner passage 30 into high pressure section 34 of chamber 28 to measure the dynamic pressure. Apparatus 10 is also configured to measure the static pressure of the cryogenic fluid stream. Outer passage 32 is positioned within the cryogenic fluid stream such that at least one second opening 46 is substantially parallel to a direction of flow 45 of the cryogenic fluid stream. A portion of the cryogenic fluid stream is directed through outer passage 32 into low pressure section 36 of chamber 28 to measure the static pressure.

A difference between the dynamic pressure and the ambient pressure is then determined. Diaphragm 50 is positioned within chamber 28. Chamber 28 is in flow communication with sensor 40. Diaphragm 50 is configured to deflect as a result of contact with the cryogenic fluid stream through inner passage 30 and outer passage 32. Apparatus 10 is configured to measure a deflection of diaphragm 50 corresponding to a difference between the dynamic pressure and the static pressure. In a particular embodiment, strain gauge 60 is operatively coupled to diaphragm 50 to measure the deflection of diaphragm 50.

In one embodiment, a method for calculating a mass flow rate of a cryogenic fluid within cold flow tube 12 is provided. The method includes positioning sensor 40 within a stream of cryogenic fluid flowing through cold flow tube 12. Sensor 40 is operatively coupled to strain gauge 60 positioned within chamber 28. A dynamic pressure of the cryogenic fluid stream and an ambient pressure of the cryogenic fluid stream are measured. A difference between the dynamic pressure and the ambient pressure is determined and the mass flow rate of the cryogenic fluid within cold flow tube 12 is calculated. In one embodiment, the mass flow rate of the cryogenic fluid is calculated using Eq. 2, set forth above.

Inner passage 30 forms first opening 42 at the upstream end of sensor 40. Sensor 40 is positioned within the cryogenic fluid stream so that a cross-sectional area of first opening 42 is substantially normal to a direction of flow of the cryogenic fluid stream. A portion of the cryogenic fluid stream is directed through inner passage 30 to measure the dynamic pressure. Outer passage 32 forms at least one second opening 46 in sidewall 48 of sensor 40. Outer passage 32 is positioned within the cryogenic fluid stream such that each second opening 46 is substantially parallel to a direction of flow of the cryogenic fluid stream. A portion of the cryogenic fluid stream is directed through second openings 46 to measure the static pressure. The cryogenic fluid stream portions directed through first opening 42 and second openings 46 are directed into chamber 28, in flow communication with sensor 40, and contact diaphragm 50 positioned at end 52 of chamber 28. This contact results in a deflection of diaphragm 50, which corresponds to a difference between the dynamic pressure and the static pressure.

In one embodiment, the portion of the cryogenic fluid stream directed through first opening 42 is directed into high pressure section 34 of chamber 28 to measure the dynamic pressure. The portion of the cryogenic fluid stream directed through second openings 46 is directed into low pressure section 36 of chamber 28 to measure the static pressure.

The above-described method and apparatus for calculating a mass flow rate of a cryogenic fluid facilitates minimizing heat leakage into the relatively colder cryogenic fluid stream from the surrounding room temperature environment and minimizing flow restriction caused when the apparatus is positioned within the cryogenic fluid stream. More specifically, the apparatus operates in a cold region with no physical contact to the room temperature surroundings and a cross-sectional area of the apparatus exposed to the cryogenic fluid stream is minimized. As a result, the mass flow rate of a cryogenic fluid can be reliably and efficiently calculated.

Exemplary embodiments of a method and apparatus for calculating a mass flow rate of a cryogenic fluid in a cryogenic fluid stream are described above in detail. The method and apparatus is not limited to the specific embodiments described herein, but rather, steps of the method and/or components of the apparatus may be utilized independently and separately from other steps and/or components described herein. Further, the described method steps and/or apparatus components can also be defined in, or used in combination with, other methods and/or components, and are not limited to practice with only the method as described herein.

While the invention has been described in terms of various specific embodiments, those skilled in the art will recognize that the invention can be practiced with modification within the spirit and scope of the claims.

What is claimed is:

1. A method for calculating a mass flow rate of a cryogenic fluid within a flow tube, said method comprises:
   operatively coupling a sensor to a strain gauge within a stream of cryogenic fluid flowing through the flow tube;
   positioning a first passage having a first opening at an upstream end of the sensor within the stream such that a cross-sectional area of the first opening is substantially normal to a direction of flow of the stream;
   positioning a second passage having at least one second opening formed in a sidewall of the sensor within the stream such that the at least one second opening is substantially parallel to a direction of flow of the stream;
   measuring a difference between a dynamic pressure of the fluid stream and a static pressure of the fluid stream; and
   calculating the mass flow rate of the cryogenic fluid within the flow tube using the measured pressure difference.

2. A method in accordance with claim 1 further comprising directing a portion of the stream through the first passage to enable the dynamic pressure to be measured.

3. A method in accordance with claim 1 further comprising directing a portion of the stream through the second passage to enable the static pressure to be measured.

4. A method in accordance with claim 1 further comprising deflecting a diaphragm operatively connected to each of the first passage and the second passage.

5. A method in accordance with claim 4 further comprising measuring a deflection of the diaphragm corresponding to a difference between the dynamic pressure and the static pressure.

6. A method in accordance with claim 4 wherein deflecting a diaphragm positioned at a first end portion of a measuring section further comprises:
   directing a portion of the stream through the first passage into a high pressure section of the chamber to measure the dynamic pressure; and
   directing a portion of the stream through the second passage into a low pressure section of the chamber to measure the static pressure.

7. A method in accordance with claim 4 further comprising inserting the housing within a vacuum-insulated space.

8. An apparatus for measuring a mass flow rate of a cryogenic fluid within a flow tube, said apparatus comprising a sensor within the cryogenic fluid stream, said sensor forming a first passage having a first opening at an upstream or lead end of said sensor within the cryogenic fluid stream such that a cross-sectional area of said first opening is substantially normal to a direction of flow of the cryogenic fluid stream, said first passage configured to measure a dynamic pressure of a cryogenic fluid stream; and said sensor further including a second passage having at least one second opening formed in a sidewall of said sensor, said sensor further configured to position said second passage within the cryogenic fluid stream such that said at least one second opening is substantially parallel to a direction of flow of the cryogenic fluid stream, said second opening configured to measure a static pressure of the cryogenic fluid stream.

9. An apparatus in accordance with claim 8 further configured to:
   direct a portion of the cryogenic fluid stream through said first passage into a high pressure section of said chamber to measure the dynamic pressure; and
   direct a portion of the cryogenic fluid stream through said second passage into a low pressure section of said chamber to measure the static pressure.

10. An apparatus in accordance with claim 9 further configured to deflect a metallic diaphragm positioned within a chamber defined within a housing, said chamber in independent flow communication with said first passage and said second passage.

11. An apparatus in accordance with claim 10 further configured to measure a deflection of said diaphragm corresponding to a difference between the dynamic pressure and the static pressure.

12. An apparatus for measuring a mass flow rate of a cryogenic fluid flowing within a flow tube, said apparatus comprising:
 a sensor at least partially positioned within said flow tube and interfering with a cryogenic fluid stream;
 a first passage defined within said sensor, said first passage having a first opening at an upstream end of said sensor, said first opening having a cross-sectional area substantially normal to a direction of flow of the cryogenic fluid stream;
 a second passage defined within said sensor, said second passage having at least one second opening formed in a sidewall of said sensor, said at least one second opening substantially parallel to the direction of flow;
 a diaphragm positioned within said chamber at a first end portion of said housing; and
 a strain gauge positioned within said chamber, said strain gauge measuring a deflection of said diaphragm corresponding to a difference between a dynamic pressure of the cryogenic fluid stream and a static pressure of the cryogenic fluid stream.

13. An apparatus in accordance with claim 12 wherein said housing is position within a vacuum-insulted space surrounding said flow tube.

14. An apparatus in accordance with claim 12 wherein said second passage is coaxially positioned about said first passage.

15. An apparatus in accordance with claim 12 wherein each of said first passage and said second passage comprises a capillary tube, said capillary tube providing flow communication between said flow tube and said chamber.

16. An apparatus in accordance with claim 12 wherein a high pressure section of said chamber is in independent flow communication with said first passage and a low pressure section of said chamber is in independent flow communication with said second passage.

* * * * *